(12) United States Patent
Chu

(10) Patent No.: US 6,180,708 B1
(45) Date of Patent: *Jan. 30, 2001

(54) THERMOPLASTIC ADSORBENT COMPOSITIONS CONTAINING WAX AND INSULATING GLASS UNITS CONTAINING SUCH COMPOSITIONS

(75) Inventor: Jia-Ni Chu, Wilmington, DE (US)

(73) Assignee: W. R. Grace & Co.-Conn., New York, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/889,656

(22) Filed: Jul. 8, 1997

Related U.S. Application Data

(63) Continuation-in-part of application No. 08/673,401, filed on Jun. 28, 1996, now Pat. No. 6,112,888.

(51) Int. Cl.$^7$ ..................................... C08K 3/34
(52) U.S. Cl. ................ 524/450; 524/275; 524/487; 524/488; 524/489
(58) Field of Search ................... 524/275, 276, 524/277, 278, 279, 450, 487, 488, 489

(56) References Cited

U.S. PATENT DOCUMENTS

| | | |
|---|---|---|
| 2,842,223 | 7/1958 | Zall . |
| 3,091,550 | 5/1963 | Doying ................. 117/76 |
| 3,211,503 | 10/1965 | Barnes . |
| 3,343,897 | 9/1967 | Keller . |
| 3,704,806 | 12/1972 | Plachenov et al. ............ 220/64 |
| 3,722,188 | 3/1973 | Cullen ................. 55/384 |
| 3,734,283 | 5/1973 | Simmons ............... 206/42 |
| 3,832,827 | 9/1974 | Lemelson .............. 53/111 |
| 3,833,406 | 9/1974 | White .................. 117/97 |
| 4,036,360 | 7/1977 | Deffeyes ............... 206/204 |
| 4,093,105 | 6/1978 | Russell et al. ........... 220/373 |
| 4,177,365 | 12/1979 | Blackman .............. 200/19 |
| 4,338,226 | * 7/1982 | Worschech ............. 524/450 |
| 4,412,617 | * 11/1983 | Cerwin . |
| 4,441,609 | 4/1984 | Crowley .............. 206/204 |
| 4,637,197 | 1/1987 | Banfield ............... 53/428 |
| 4,656,210 | * 4/1987 | Erwied ................ 524/155 |
| 4,747,488 | 5/1988 | Kikuchi ............... 206/444 |
| 4,753,352 | 6/1988 | Dauphin et al. ......... 206/538 |
| 4,777,780 | 10/1988 | Holzwarth ............. 53/432 |
| 4,852,732 | * 8/1989 | Wilski et al. . |
| 4,957,521 | 9/1990 | Cullen et al. ........... 55/387 |
| 5,080,225 | 1/1992 | Russo et al. ........... 206/204 |
| 5,082,878 | * 1/1992 | Bansleben ............. 523/523 |
| 5,161,686 | 11/1992 | Weber et al. ........... 206/440 |
| 5,177,916 | 1/1993 | Misera et al. .......... 52/172 |
| 5,223,220 | 6/1993 | Fan et al. ............. 422/58 |
| 5,244,707 | 9/1993 | Shores ................ 428/76 |
| 5,304,419 | 4/1994 | Shores ................ 428/355 |
| 5,313,761 | 5/1994 | Leopold ............... 52/788 |
| 5,322,161 | 6/1994 | Shichman et al. ........ 206/204 |
| 5,378,428 | 1/1995 | Inoue et al. ............ 422/9 |
| 5,390,475 | 2/1995 | Iwauchi et al. .......... 53/474 |
| 5,500,067 | 3/1996 | Jenkner ............... 156/146 |
| 5,510,416 | 4/1996 | Meyer et al. ........... 524/528 |
| 5,632,122 | 5/1997 | Spinks ................ 52/172 |
| 5,641,826 | * 6/1997 | Lawson ............... 524/417 |
| 5,710,189 | * 1/1998 | Brandt ................ 521/91 |

FOREIGN PATENT DOCUMENTS

| | | | |
|---|---|---|---|
| 96/08541 | 3/1996 | (WO) . | |
| WO97/00724 | 1/1997 | (WO) ............. | B01J/20/28 |

* cited by examiner

*Primary Examiner*—Paul R. Michl
(74) *Attorney, Agent, or Firm*—Charles A. Cross

(57) ABSTRACT

The incorporation of waxes into thermoplastic adsorbent compositions enables the formation of high adsorbent loading compositions which have suitable flowability properties. The wax-containing thermoplastic adsorbent compositions are especially useful as thermoplastic adsorbent adhesives for use in desiccating interior compartments of insulating glass units.

52 Claims, No Drawings

THERMOPLASTIC ADSORBENT COMPOSITIONS CONTAINING WAX AND INSULATING GLASS UNITS CONTAINING SUCH COMPOSITIONS

This application is a continuation-in-part of U.S. patent application Ser. No. 08/673,401 filed on Jun. 28, 1996, now U.S. Pat. No. 6,112,888.

BACKGROUND OF THE INVENTION

Recently interest had increased in thermoplastic resin systems which contain desiccants or other adsorbents, especially where the resulting system is used to deliver an adsorption and/or desiccation function to an environment. This interest is especially apparent in the insulating glass industry where recent technological developments such as those described in U.S. Pat. Nos. 5,313,761 and 5,177,916 have proved to be reliant on the ability to deliver a flowable, adhesive desiccant formulation in the manufacture of insulating glass units.

Various formulations have been proposed to meet the needs of the insulating glass industry. Examples of formulations are disclosed in U.S. Pat. Nos. 5,510,416 and 5,632,122 as well as in PCT Published Application WO 96/08541.

While the existing formulations have significant commercial use, there is a constant desire to improve the formulations by minimizing the amount of resin component needed to deliver and maintain the necessary amount of desiccant in the desired location (e.g. adhered to a U-shaped window spacer).

In meeting the need for higher loading/more efficient formulations, it is generally desirable that the formulations are usable in existing equipment such that the implementation of the formulation would not require any additional expenditure for equipment by the user. Thus, it is highly desirable that the requirements for handling the formulation (i.e. heating, pumping, applying) do not become more severe. This presents a significant challenge in the context of flowable thermoplastic resin systems since the formulation viscosity typically increases sharply as a function of adsorbent loading just above the maximum practical loading for the specific formulation. Thus, simply increasing the amount of adsorbent even in a seemingly minor amount (or decreasing the amount of resin component) would result in a large increase in viscosity for the overall formulation at application temperature.

Additionally, it is desirable that the formulation not present any loss of performance in other aspects which may be important to the specific end use. Thus, where the formulation is to be used in an insulating glass unit such as described in the above mentioned patents, the formulation should resistant to slump and provide adequate adhesion to the window spacer.

SUMMARY OF THE INVENTION

The invention provides improved thermoplastic adsorbent compositions which enable reduction in the amount of resin needed to deliver a given amount of adsorbent without deterioration of viscosity/handling performance. The invention also provides improved thermoplastic adsorbent compositions which enable the delivery of a given amount of adsorbent more reliably and/or under less severe handling/application conditions.

In one aspect, the invention encompasses thermoplastic adsorbent compositions which contain (a) an adsorbent component and (b) a thermoplastic organic matrix component containing (i) wax, and (ii) thermoplastic polymer resin, wherein said wax has a weight average molecular weight of about 800–10000 and is compatible with the thermoplastic resin (i.e. not prone to phase separation or other adverse interaction when combined).

In another aspect, the invention encompasses thermoplastic adsorbent compositions which contain (a) an adsorbent component and (b) a thermoplastic organic matrix component wherein the composition contains at least 55 wt.% of adsorbent component and has an apparent viscosity of about $3 \times 10^6$ cP or less measured according to ASTM test D-3236-88 at 124° C. and 0.125 sec$^{-1}$ shear rate. The compositions are preferably adhesive and resistant to slump.

In another aspect, the invention encompasses insulating glass units containing thermoplastic adsorbent compositions which contain (a) an adsorbent component and (b) a thermoplastic organic matrix component containing (i) wax, and (ii) thermoplastic polymer resin, wherein the wax has a weight average molecular weight of about 800–10000 and is compatible with the thermoplastic resin (i.e. not prone to phase separation or other adverse interaction when combined). Preferably, the adsorbent component contains a desiccating adsorbent and the formulation desiccates a compartment partially defined by two or more panes of the insulating glass unit.

The compositions of the invention may also be used for other adsorption applications. These and other aspects of the invention are described in further detail below.

DETAILED DESCRIPTION OF THE INVENTION

The invention encompasses thermoplastic adsorbent compositions containing an adsorbent component dispersed in a thermoplastic organic matrix component wherein the organic matrix component contains (i) wax, and (ii) thermoplastic polymer resin. The compositions of the invention are especially useful for forming high adsorbent loading thermoplastic compositions which can be applied using conventional hot melt applicator equipment and conventional hot melt application conditions. The invention also encompasses articles such as insulating glass units which include the thermoplastic adsorbent compositions of the invention.

The adsorbent component used in the compositions of the invention may be any conventional adsorbent material such as zeolites, silica gels, activated carbons, silica aluminas, non-zeolite molecular sieves, etc. Non-reactive inorganic oxide desiccants are generally preferred. The adsorbent(s) may be selected to perform a specific function or combination of functions. Thus, adsorbents adapted to adsorb specific elements, compounds or classes thereof may be used. Preferably, the adsorbent component contains an adsorbent such as zeolite A, especially zeolite 3A, which is adapted to primarily adsorb water. The adsorbent component may also contain adsorbents designed to adsorb low molecular weight organic compounds (e.g. zeolite 13X) alone or in combination with the water-adsorbing adsorbent.

The thermoplastic organic matrix is characterized by the presence of one or more waxes wherein the wax has a weight average molecular weight of about 800–10000. The wax should also be compatible with the thermoplastic resin contained in the organic matrix. That is, the wax should not be prone to phase separate from the wax/resin combination after blending. The wax should not have any other adverse interaction with the resin or other components. The wax is preferably a polymer wax, more preferably an olefin-containing polymer wax. Most preferably, the wax is an olefin homopolymer wax such as polyethylene wax or polypropylene wax. The wax preferably has a weight average molecular weight of about 1000–6000, more preferably about 1500–5000. The wax component is believed to impart lower viscosity at application temperature for the thermoplastic adhesive composition while avoiding slump or flow of the composition at the actual use temperature. Preferred waxes are Epolene® N-14 polyethylene wax ($M_w$=4000) sold by Eastman Chemical Co. and AC-1702 polyethylene wax sold by Allied Signal ($M_w$=1850). The weight average molecular weights in this application are based on ASTM D3536-91 using GPC.

In addition to the wax component, the organic matrix contains one or more thermoplastic resins. The thermoplastic resin preferably comprises one or more polyolefin resins, e.g. polyethylene, polypropylene, olefin copolymers, olefin terpolymers or combinations thereof; however in some instances other thermoplastic resin systems may also be employed. The thermoplastic resin has a weight average molecular weight of greater than 10,000, preferably at least about 30,000, more preferably at least about 50,000 The thermoplastic resin preferably has a softening point (ring and ball) of about 30–200° C., more preferably about 50–150° C. Where the resin is crystalline, it preferably has a melting point of about 50–250° C., more preferably about 80–200° C. The thermoplastic resin preferably has a Brookfield melt viscosity (@190° C. spindle #27) of about 150–10,000 centipoise, more preferably about 1500–8,000 cP. All Brookfield melt viscosity's specified herein were measured with a Brookfield Thermosel, model HBDV-111 apparatus. A preferred thermoplastic resin is RT-2730 butene copolymer ($M_w$=60,000–65,000) sold by Rexene Corp.

The organic matrix may also contain auxiliary components such as tackifiers, coloring agents, scents, lubricants, stabilizers, etc. For most applications, tackifiers and auxiliary components are preferably kept to a minimum or are avoided entirely.

The relative amounts of the wax component and the thermoplastic resin component may be varied depending on the specific wax(es) and resin(s) selected, the desired adsorbent loading and the desired flowability characteristics. In general, the wax component acts to promote the flowability of the composition at application temperature relative to the effect of the resin component at a given adsorbent loading. Increased adsorbent loading generally acts to decrease flowability of the composition at application temperature for a given organic matrix composition. The overall rheological characteristics of the thermoplastic adsorbent compositions of the invention may be varied somewhat depending on the desired application conditions and end use. Where the end use is as a hot melt desiccant adhesive for use in windows such as those disclosed in US Pat. Nos. 5,313,761 and 5,177,916, the overall composition preferably has an apparent viscosity of about $3 \times 10^6$ cP or less, more preferably about $2 \times 10^6$ cP or less, measured according to ASTM test D-3236-88 at 124° C. and 0.125 $sec^{-1}$ shear rate.

The relative amount of adsorbent component in the adsorbent/organic matrix composition may be varied considerably, depending on the desired adhesive and/or rheological properties of the composition, the adsorption capacity of the specific adsorbent(s), the desired adsorption capability in the end use environment, etc. In general, the thermoplastic adsorbent matrix compositions of the invention preferably contain at least about 15 wt.% adsorbent, more preferably about 20–80%, most preferably about 50–65 wt. %. The typical range for us in insulating glass units is preferably about 55–60 wt. %. Where the compositions of the invention are used to desiccate a compartment of an insulating glass unit, such as in U.S. Pat Nos. 5,313,761 and 5,177,916, the adsorbent component preferably contains a combination of an adsorbent adapted to primarily adsorb water and an adsorbent for removing low molecular weight organic volatiles. Preferably, the adsorbent for removing low molecular weight organic volatiles represents less than about 10 wt. % of the overall composition.

As noted above, the relative amounts of the wax and the thermoplastic resin may be varied considerably depending on the desired application characteristics and adsorbent loading. In general, the organic matrix preferably contains about 2–20 wt. % total of the wax based on the total weight of the organic matrix, more preferably about 2–10 wt. %. The organic matrix preferably contains about 10–50 wt. % total thermoplastic resin based on the total weight of the organic matrix, more preferably about 20–45 wt. %.

The thermoplastic adsorbent compositions of the invention may be formed using conventional compounding techniques. For example, the components can be simply loaded into a kneader extruder, twin screw extruder or other appropriate device to obtain the composition with the desired degree of desiccant dispersion. The formation of the thermoplastic adsorbent compositions of the invention is preferably characterized by the absence of any solvent.

In these processes, the thermoplastic adsorbent compositions of the invention can be applied using equipment known for depositing hot melt adhesives such as equipment manufactured by Airprint Systems Inc., The Dexter Corp., Nordson Corp., Spraymation, Inc. and others. Using this equipment, it is possible to deposit the desiccant/organic matrix compositions of the invention via spraying, rolling, extrusion, etc. Where the compositions of the invention are to be applied to the spacers of insulating glass units such as described in U.S. Pat. Nos. 5,313,761 and 5,177,916, the compositions are preferably applied using equipment manufactured by Glass Equipment Development, Inc. The disclosures of U.S. Pat. Nos. 5,313,761 and 5,177,916 are incorporated herein by reference. The compositions of the invention may also be used in packaging applications such as those described in U.S. patent application Ser. No. 08/1673,401 filed on Jun. 28, 1996, the disclosure of which is incorporated herein by reference.

The general method of the applying the compositions of the invention involves heating the composition to a suitable temperature in order to reduce its viscosity to a point where the composition can be flowed using the desired application technique. For example, where the composition is applied by extrusion on a low speed manufacturing line, a higher viscosity may be usable compared to higher speed manufacturing lines or where the composition is applied by spraying or dripping. Typically, the composition will be heated to about 50–300° C. (more preferably about 80–150° C., most preferably about 90–120° C.) to affect the necessary viscosity reduction. Once deposited, the composition is allowed to cool whereby the composition becomes fixed in the desired position.

The following examples illustrate some of the compositions of the invention.

EXAMPLE 1

A thermoplastic adsorbent composition was formed by combining the following ingredients in a kneader extruder:

|  | Parts by weight |
| --- | --- |
| Polyethylene Wax (Epolene ® N-14) | 3.2 |
| Butene Copolymer Resin (RT-2730) | 35 |
| Thermal stabilizer (Irganox ® 1010) | 0.3 |
| Zeolite 3A (Grace Davison A3) | 52 |
| Zeolite 13X (Grace Davison A10) | 5 |
| Gray Pigment (TiO$_2$ + carbon black) | 4.5. |

The composition was tested for its rheological and water adsorptive properties. The results are reported in Table 1 below. The composition was tested for water adsorption by determining the equilibrium weight of water adsorbed at 88° C. at 84% R.H. The composition was applied to a metal substrate at 121° C. application temperature and the Lap Shear Adhesion was measured at 25° C. according to ASTM C 961-87. The melt flow was measured according to ASTM D-1238, Procedure B using a 1.2 Kg load at 124° C. The apparent viscosity was measured according to ASTM test D-3236-88 at 124° C. and 0.125 sec$^{-1}$ shear rate using a Brookfield Thermosel, model HBDV-Ill apparatus. The ring and ball softening point was measured according to ASTM E 28-67.

EXAMPLE 2

A thermoplastic adsorbent composition was in a manner similar to Example 1 except that the wax content and adsorbent loading were increased as indicated in Table 1. The properties of the resulting material are reported in Table 1.

EXAMPLE 3

A thermoplastic adsorbent composition was in a manner similar to Example 1 except that the Allied Signal AC-1702 polyethylene wax was substituted for Epolene® N-14. The properties of the resulting material are reported in Table 1.

COMPARISON EXAMPLE

A thermoplastic adsorbent composition was prepared as in Example 1 except that no wax was used, and the amount of thermoplastic resin and adsorbent were increased as indicated in Table 1. The properties of the resulting material are reported in Table 1. It can be seen that the apparent viscosity at 124° C. is significantly higher in the absence of wax.

TABLE 1

| Example | 1 | 2 | 3 | Comparison |
| --- | --- | --- | --- | --- |
| Composition in Weight Percent | | | | |
| RT-2730 Resin | 35 | 30 | 35 | 36.1 |
| N-14 Wax | 3.2 | 5.2 | — | — |
| AC1702 Wax | — | — | 3.2 | |
| Zeolite 3A | 52 | 55 | 52 | 54 |
| Zeolite 13X | 5 | 5 | 5 | 6 |
| Irganox ® 1010 | 0.3 | 0.3 | 0.3 | 0.24 |
| Gray Pigment | 4.5 | 4.5 | 4.5 | 3.6 |
| Properties | | | | |
| Water Adsorption @ 88° C. (wt. %) | 11.22 | 11.9 | 10.04 | 10.51 |
| Lap Shear Adhesion (psi) | 129.2 | 142.9 | — | 130 |
| MFI @ 124° C./1.2 Kg (g/10 min) | 15.65 | — | 16.85 | 3.695 |
| Apparent Viscosity (10$^6$ cP) | 1.74 | 2.27 | 1.36 | 4.66 |
| Ring & ball softening point (° C.) | 122.3 | — | — | 139 |

What is claimed is:

1. A thermoplastic adsorbent composition comprising an adsorbent component dispersed in a thermoplastic organic matrix, said matrix containing a wax component and a thermoplastic resin component, said composition containing at least about 55 wt. % of said adsorbent component based on the total weight of the composition, said composition containing at least about 2 wt. % of said wax based on the combined weight of said wax and said thermoplastic resin, said wax having a weight average molecular weight of about 800–10,000, and said thermoplastic resin having a weight average molecular weight greater than 10,000 wherein said thermoplastic adsorbent composition is flowable at 124° C. and is capable of adsorbing water to an extent sufficient for desiccating void spaces of insulated glass units.

2. The composition of claim 1 wherein said composition has an apparent viscosity of about 3×10$^6$ cP or less measured according to ASTM test D-3236-88 at 124° C. and 0.125 sec$^{-1}$ shear rate.

3. The composition of claim 2 wherein said composition contains about 57–65 wt. % of said adsorbent component.

4. The composition of claim 1 wherein said wax is selected from the group consisting of olefin-containing polymer wax and mixtures thereof.

5. The composition of claim 1 wherein said wax has a weight average molecular weight of about 1000–8000.

6. The composition of claim 2 wherein said apparent viscosity is about 2×10$^6$ cP or less.

7. The composition of claim 1 wherein said adsorbent component includes an adsorbent selected from the group consisting of zeolites, silica gels, activated carbons, silica aluminas, non-zeolite molecular sieves, and mixtures thereof.

8. The composition of claim 1 wherein said adsorbent component includes zeolite 3A.

9. The composition of claim 8 wherein said adsorbent component further includes zeolite 13X.

10. The composition of claim 9 wherein said composition contains about 10 wt. % or less of zeolite 13X.

11. The composition of claim 1 wherein said thermoplastic resin has a weight average molecular weight of about 30,000.

12. A thermoplastic adsorbent composition comprising an adsorbent component dispersed in a thermoplastic organic matrix, said matrix containing a wax component selected from the group consisting of olefin-containing polymer was and mixtures thereof and a thermoplastic resin component, said composition containing at least about 15 wt. % of said adsorbent component based on the total weight of the composition, said composition containing at least about 2 wt. % of said wax based on the combined weight of said wax and said thermoplastic resin, said wax having a weight average molecular weight of about 800–10,000, and said thermoplastic resin having a weight average molecular weight greater than 10,000 wherein said thermoplastic adsorbent composition is flowable at 124° C. and is capable of adsorbing water to an extent sufficient for desiccating void spaces of insulated glass units.

13. The composition of claim 12 wherein said composition has an apparent viscosity of about 3×10$^6$ cP or less measured according to ASTM test D-3236-88 at 124° C. and 0.125 sec$^{-1}$ shear rate.

14. The composition of claim 12 wherein said composition contains at least about 55 wt. % of said adsorbent component.

15. The composition of claim 12 wherein said wax has a weight average molecular weight of about 1000–8000.

16. The composition of claim 13 wherein said apparent viscosity is about 2×10$^6$ cP or less.

17. The composition of claim 12 wherein said adsorbent component includes an adsorbent selected from the group consisting of zeolites, silica gels, activated carbons, silica aluminas, non-zeolite molecular sieves, and mixtures thereof.

18. The composition of claim 17 wherein said adsorbent component includes zeolite 3A and zeolite 13X.

19. The composition of claim 12 wherein said thermoplastic resin has a weight average molecular weight of about 30,000.

20. A thermoplastic adsorbent composition comprising an adsorbent component dispersed in a thermoplastic organic matrix, said matrix containing a wax component and a thermoplastic resin component selected from the group consisting of olefin-containing polymer and mixtures thereof, said composition containing at least about 15 wt. % of said adsorbent component based on the total weight of the composition, said composition containing at least about 2 wt. % of said wax based on the combined weight of said wax and said thermoplastic resin, said wax having a weight average molecular weight of about 800–10,000, and said thermoplastic resin having a weight average molecular weight greater than 10,000 wherein said thermoplastic adsorbent composition is flowable at 124° C. and is capable of adsorbing water to an extent sufficient for desiccating void spaces of insulated glass units.

21. The composition of claim 20 wherein said composition has an apparent viscosity of about 3×10$^6$ cP or less measured according to ASTM test D-3236-88 at 124° C. and 0.125 sec$^{-1}$ shear rate.

22. The composition of claim 20 wherein said composition contains at least about 55 wt. % of said adsorbent component.

23. The composition of claim 20 wherein said wax is selected from the group consisting of olefin-containing polymer wax and mixtures thereof.

24. The composition of claim 21 wherein said apparent viscosity is about 2×10$^6$ cP or less.

25. The composition of claim 20 wherein said adsorbent component includes an adsorbent selected from the group consisting of zeolites, silica gels, activated carbons, silica aluminas, non-zeolite molecular sieves, and mixtures thereof.

26. The composition of claim 20 wherein said thermoplastic resin has a weight average molecular weight of about 30,000.

27. An insulating glass unit comprising at least two panes of glass and a spacer element which together define an enclosed space within said unit, said unit being characterized by the presence of a thermoplastic adsorbent composition in communication with said enclosed space, said thermoplastic adsorbent composition comprising an adsorbent component dispersed in a thermoplastic organic matrix, said matrix containing a wax component and a thermoplastic resin component, said composition containing at least about 50 wt. % of said adsorbent component based on the total weight of the composition, said composition containing at least about 2 wt. % of said wax having a weight average molecular weight of about 800–10,000, and said thermoplastic resin having a weight average molecular weight greater than 10,000 wherein said thermoplastic adsorbent composition is flowable at 124° C. and is capable of adsorbing water to an extent sufficient for desiccating the enclosed space of said unit.

28. The insulating glass unit of claim 27 wherein said thermoplastic adsorbent composition is adhered to said spacer element.

29. The insulating glass unit of claim 27 wherein said wax is selected from the group consisting of olefin-containing polymer waxes and mixtures thereof.

30. The insulating glass unit of claim 27 wherein said wax has a weight average molecular weight of about 1000–8000.

31. The insulating glass unit of claim 27 wherein said adsorbent component includes an adsorbent selected from the group consisting of the group consisting of zeolites, silica gels, activated carbons, silica aluminas, non-zeolite molecular sieves, and mixtures thereof.

32. The insulating glass unit of claim 31 wherein said adsorbent component includes a zeolite 3A.

33. The insulating glass unit of claim 32 wherein said adsorbent component further includes a zeolite 13X.

34. The insulating glass unit of claim 33 wherein said composition contains about 10 wt. % or less of zeolite 13X.

35. The insulating glass unit of claim 27 wherein said thermoplastic resin has a weight average molecular weight of at least about 30,000.

36. The insulating glass unit of claim 27 wherein said thermoplastic resin is selected from the group consisting of olefin-containing polymers and mixtures thereof.

37. An insulating glass unit comprising at least two panes of glass and a spacer element which together define an enclosed space within said unit, said unit being characterized by the presence of a thermoplastic adsorbent composition in communication with said enclosed space, said thermoplastic adsorbent composition comprising an adsorbent component dispersed in a thermoplastic organic matrix, said matrix containing a wax component selected from the group consisting of olefin-containing polymer wax and mixtures thereof and a thermoplastic resin component, said composition containing at least about 15 wt. % of said adsorbent component based on the total weight of the composition, said composition containing at least about 2 wt. % of said wax having a weight average molecular weight of about 800–10,000, and said thermoplastic resin having a weight average molecular weight greater than 10,000 wherein said thermoplastic adsorbent composition is flowable at 124° C. and is capable of adsorbing water to an extent sufficient for desiccating the enclosed space of said unit.

38. The insulating glass unit of claim 37 wherein said thermoplastic adsorbent composition is adhered to said spacer element.

39. The insulating glass unit of claim 37 wherein said thermoplastic composition contains at least about 50 wt. % of said adsorbent component.

40. The insulating glass unit of claim 37 wherein said wax has a weight average molecular weight of about 1000–8000.

41. The insulating glass unit of claim 37 wherein said adsorbent component includes an adsorbent selected from the group consisting of the group consisting of zeolites, silica gels, activated carbons, silica aluminas, non-zeolite molecular sieves, and mixtures thereof.

42. The insulating glass unit of claim 41 wherein said adsorbent component includes zeolite 3A and zeolite 13X.

43. The insulating glass unit of claim 37 wherein said thermoplastic resin has a weight average molecular weight of at least about 30,000.

44. The insulating glass unit of claim 37 wherein said thermoplastic adsorbent composition comprises about 20–80 wt. % adsorbent.

45. An insulating glass unit comprising at least two panes of glass and a spacer element which together define an enclosed space within said unit, said unit being characterized by the presence of a thermoplastic adsorbent composition in communication with said enclosed space, said thermoplastic adsorbent composition comprising an adsorbent component dispersed in a thermoplastic organic matrix, said matrix containing a wax component and a thermoplastic resin component selected from the group consisting of olefin-containing polymer and mixtures thereof, said composition containing at least about 15 wt. % of said adsorbent component based on the total weight of the composition, said composition containing at least about 2 wt. % of said wax having a weight average molecular weight of about 800–10,000, and said thermoplastic resin having a weight average molecular weight greater than 10,000 wherein said thermoplastic adsorbent composition is flowable at 124° C. and is capable of adsorbing water to an extent sufficient for desiccating the enclosed space of said unit.

46. The insulating glass unit of claim 45 wherein said thermoplastic adsorbent composition is adhered to said spacer element.

47. The insulating glass unit of claim 45 wherein said thermoplastic composition contains at least about 50 wt. % of said adsorbent component.

48. The insulating glass unit of claim 45 wherein said wax is selected from the group consisting of olefin-containing polymer wax and mixtures thereof.

49. The insulating glass unit of claim 45 wherein said wax has a weight average molecular weight of about 1000–8000.

50. The insulating glass unit of claim 45 wherein said adsorbent component includes an adsorbent selected from the group consisting of the group consisting of zeolites, silica gels, activated carbons, silica aluminas, non-zeolite molecular sieves, and mixtures thereof.

51. The insulating glass unit of claim 45 wherein said thermoplastic resin has a weight average molecular weight of at least about 30,000.

52. The composition of claim 12 comprising about 20–80% of said adsorbent.

* * * * *

UNITED STATES PATENT AND TRADEMARK OFFICE
CERTIFICATE OF CORRECTION

PATENT NO. : 6,180,708 B1
DATED : January 30, 2001
INVENTOR(S) : Jia-Ni Chu

Page 1 of 1

It is certified that error appears in the above-identified patent and that said Letters Patent is hereby corrected as shown below:

Column 6,
Line 41, (line 1 of claim 8) "claim 1" should be "claim 7".
Line 53, (line 4 of claim 12) "polymer was" should be "polymer wax".

Signed and Sealed this

Eighteenth Day of September, 2001

Attest:

Nicholas P. Godici

NICHOLAS P. GODICI
*Attesting Officer*
*Acting Director of the United States Patent and Trademark Office*